US005361669A

United States Patent [19]

Genna

[11] Patent Number: 5,361,669

[45] Date of Patent: Nov. 8, 1994

[54] PASSIVE RADIATOR BAFFLE PANEL FOR DRUM TYPE-PERCUSSION INSTRUMENTS

[76] Inventor: Robert A. Genna, 4 Talbot La., Greenwich, Conn. 06830

[21] Appl. No.: 851,740

[22] Filed: Mar. 16, 1992

Related U.S. Application Data

[63] Continuation-in-part of Ser. No. 525,200, May 18, 1990, Pat. No. 5,095,796.

[51] Int. Cl.[5] .................... G01D 13/02

[52] U.S. Cl. .................... 84/414; 181/156

[58] Field of Search .................... 84/414, 413, 411 M, 84/411 R; 181/156

[56] References Cited

U.S. PATENT DOCUMENTS 4,146,111 3/1979 Mae et al. .................... 181/154
4,742,753 5/1988 Speed .................... 84/414
4,790,228 12/1988 Thirion .................... 84/411
4,805,514 2/1989 Billings .................... 84/411
5,095,796 3/1992 Genna .................... 84/414
5,159,139 10/1992 Beals et al. .................... 84/414

OTHER PUBLICATIONS

Cohen, "Hi-Fi Loudspeakers and Enclosures" (2d ed) (Chapter 9) (1968).

*Primary Examiner*—Michael L. Gellner
*Assistant Examiner*—Cassandra Spyrou
*Attorney, Agent, or Firm*—St. Onge, Steward Johnston & Reens

[57] ABSTRACT

A passive radiator baffle which mounts to the side opposite the beater drumhead membrane side of acoustic drums and is used by musicians to enhance the live acoustic sound of these drum percussion instruments by adding low-frequency punch to their performance. This low-frequency response is achieved by selecting the mass of an acoustically suspended piston to provide tuning the drum enclosure to a selected frequency.

20 Claims, 9 Drawing Sheets

(DO NOT CONNECT MIC-CAPSULE GROUND TO CIRCUIT GROUND.)
(ALL VOLTAGES MEASURED WITH 48V PHANTOM POWER APPLIED.)

TUNED PASSIVE-RADIATOR PISTON
DESIGN PARAMETERS
(IN INCH/OUNCE/SECOND UNITS & CENTIMETER/GRAM/SECOND UNITS)

| BASS DRUM DIAMETER IN/CM | DRUM DEPTH IN/CM | DRUM INSIDE DIAMETER IN/CM | DRUM VOLUME IN^3/CM^3 | EFFECTIVE PASSIVE-RADIATOR PISTON DIAMETER IN/CM | EFFECTIVE PASSIVE-RADIATOR PISTON AREA IN^2/CM^2 | TUNED PASSIVE-RADIATOR PISTON FREQUENCY HZ |
|---|---|---|---|---|---|---|
| 44/111.8 | 22/55.88 | 43.37/110.2 | 32,500.6/532,591.4 | 40/101.6 | 1,256.6/8,107.319 | 10 |
| 42/106.7 | 20/50.80 | 41.37/105.1 | 26,883.8/440,548.5 | 38/96.52 | 1,134.1/7,316.856 | 30 |
| 40/101.6 | 18/47.72 | 39.37/100.0 | 21,912.6/374,792.0 | 36/91.44 | 1,017.9/6,566.929 | 10 |
| 38/96.52 | 18/47.72 | 39.37/94.92 | 19,742.8/337,680.3 | 34/86.36 | 907.920/5,857.538 | 20 |
| 36/91.44 | 16/40.64 | 35.37/89.84 | 15,721.0/257,622.1 | 32/81.28 | 804.248/5,188.685 | 40 |
| 34/86.36 | 16/40.64 | 33.37/84.76 | 13,993.4/229,311.3 | 30/76.20 | 706.858/4,560.367 | 10 |
| 32/81.28 | 16/40.64 | 31.37/79.68 | 12,366.3/155,428.0 | 28/71.12 | 615.752/3,972.587 | 30 |
| 30/76.20 | 14/35.56 | 29.37/74.60 | 9,484.7/155,428.0 | 26/66.04 | 530.929/3,425.343 | 50 |
| 28/71.12 | 16/40.64 | 27.37/69.52 | 9,413.7/153,263.5 | 24/60.96 | 452.389/2,918.635 | 20 |
| 26/66.04 | 14/35.56 | 25.125/63.82 | 6,941.1/113,765.1 | 20/50.80 | 314.159/2,026.830 | 60 |
| 26/66.04 | 16/40.64 | 25.125/63.82 | 7,932.7/130,017.2 | 21/53.34 | 346.360/2,234.580 | 60 |
| 26/66.04 | 18/45.72 | 25.125/63.82 | 8,924.3/146,269.4 | 22/55.88 | 380.133/2,452.464 | 50 |
| 26/66.04 | 20/50.80 | 25.125/63.82 | 9,915.9/162,521.6 | 23/58.42 | 415.478/2,680.483 | 50 |
| 26/66.04 | 22/55.88 | 25.125/63.82 | 10,907.5/178,773.7 | 24/60.96 | 452.389/2,918.635 | 40 |
| 26/66.04 | 14/35.56 | 25.125/63.82 | 6,941.1/113,765.1 | 20/50.80 | 314.159/2,026.830 | 40 |
| 26/66.04 | 16/40.64 | 25.125/63.82 | 7,932.7/130,017.2 | 21/53.34 | 346.360/2,234.580 | 30 |
| 26/66.04 | 18/45.72 | 25.125/63.82 | 8,924.3/146,269.4 | 22/55.88 | 380.133/2,452.464 | 20 |
| 26/66.04 | 20/50.80 | 25.125/63.82 | 9,915.9/162,521.6 | 23/58.42 | 415.478/2,680.483 | 15 |
| 26/66.04 | 22/55.88 | 25.125/63.82 | 10,907.5/178,773.7 | 24/60.96 | 452.389/2,918.635 | 10 |
| 24/60.96 | 14/35.56 | 23.125/58.74 | 5,880.0/96,373.2 | 20/50.80 | 314.159/2,026.830 | 50 |
| 24/60.96 | 16/40.64 | 23.125/58.74 | 6,720.0/110,140.8 | 21/53.34 | 346.360/2,234.580 | 40 |
| 24/60.96 | 18/45.72 | 23.125/58.74 | 7,560.0/123,908.4 | 22/55.88 | 380.133/2,452.464 | 30 |
| 22/55.88 | 14/35.56 | 21.25/53.98 | 4,965.2/81,379.6 | 18/45.72 | 254.469/1,641.732 | 60 |
| 22/55.88 | 16/40.64 | 21.25/53.98 | 5,674.5/93,005.1 | 19/48.26 | 283.529/1,829.214 | 50 |
| 22/55.88 | 18/45.72 | 21.25/53.98 | 6,383.8/104,630.5 | 20/50.80 | 314.159/2,026.830 | 40 |
| 20/50.80 | 14/35.56 | 19.25/48.90 | 4,074.5/66,781.1 | 16/40.64 | 201.062/1,297.171 | 60 |
| 20/50.80 | 16/40.64 | 19.25/48.90 | 4,656.6/76,321.7 | 18/45.72 | 254.469/1,641.732 | 50 |
| 18/45.72 | 16/40.64 | 17.125/43.50 | 3,685.3/60,402.1 | 16/40.64 | 201.062/1,297.171 | 70 |
| FLOOR TOM DIAMETER IN/CM | | | | | | |
| 20/50.80 | 18/45.72 | 19.25/48.90 | 5,238.7/85,862.3 | 18/45.72 | 254.469/1,641.732 | 60 |
| 18/45.72 | 16/40.64 | 17.125/43.50 | 3,685.3/60,402.1 | 16/40.64 | 201.062/1,297.171 | 70 |
| 18/45.72 | 19/48.26 | 17.125/43.50 | 4,376.3/71,727.6 | 16/40.64 | 201.062/1,297.171 | 60 |
| 18/45.72 | 19/48.26 | 17.125/43.50 | 4,376.3/71,727.6 | 16/40.64 | 201.062/1,297.171 | 70 |
| 16/40.64 | 16/40.64 | 15.1875/38.58 | 2,898.6/47,508.1 | 14/35.56 | 153.938/993.147 | 80 |
| 16/40.64 | 18/45.72 | 15.1875/38.58 | 3,260.9/53,446.2 | 14/35.56 | 153.938/993.147 | 70 |
| 16/40.64 | 18/45.72 | 15.1875/38.58 | 3,260.9/53,446.2 | 14/35.56 | 153.938/993.147 | 80 |
| 14/35.56 | 14/35.56 | 13.25/33.66 | 1,930.4/31,639.3 | 12/30.48 | 113.1/729.7 | 90 |
| 14/35.56 | 14/35.56 | 13.25/33.66 | 1,930.4/31,639.3 | 12/30.48 | 113.1/729.7 | 100 |
| MOUNTED TOM DIAMETER IN/CM | | | | | | |
| 16/40.64 | 14/35.56 | 15.1875/38.58 | 2,536.2/41,568.3 | 14/35.56 | 153.938/993.147 | 80 |
| 16/40.64 | 16/40.64 | 15.1875/38.58 | 2,898.6/47,508.0 | 14/35.56 | 153.938/993.147 | 80 |
| 15/38.10 | 12/30.48 | 14.1875/36.04 | 1,897.1/31,093.5 | 13/33.02 | 132.730/856.340 | 80 |
| 15/38.10 | 12/30.48 | 14.1875/36.04 | 1,897.1/31,093.5 | 13/33.02 | 132.730/856.340 | 90 |
| 15/38.10 | 14/35.56 | 14.1875/36.04 | 2,213.2/36,274.3 | 13/33.02 | 132.730/856.340 | 80 |
| 15/38.10 | 14/35.56 | 14.1875/36.04 | 2,213.2/36,274.3 | 13/33.02 | 132.730/856.340 | 90 |
| 15/38.10 | 15/38.10 | 14.1875/36.04 | 2,371.3/38,865.6 | 13/33.02 | 132.730/856.340 | 80 |
| 15/38.10 | 15/38.10 | 14.1875/36.04 | 2,371.3/38,865.6 | 13/33.02 | 132.730/856.340 | 90 |
| 15/38.10 | 17/43.18 | 14.1875/36.04 | 2,687.5/44,048.0 | 13/33.02 | 132.730/856.340 | 80 |
| 15/38.10 | 17/43.18 | 13.25/33.66 | 2,687.5/44,048.0 | 13/33.02 | 132.730/856.340 | 90 |
| 14/35.56 | 10/25.40 | 13.25/33.66 | 1,378.9/22,600.2 | 12/30.48 | 113.1/729.70 | 90 |
| 14/35.56 | 10/25.40 | 13.25/33.66 | 1,378.9/22,600.2 | 12/30.48 | 113.1/729.70 | 100 |
| 14/35.56 | 12/30.48 | 13.25/33.66 | 1,654.6/27,118.9 | 12/30.48 | 113.1/729.70 | 90 |
| 14/35.56 | 12/30.48 | 13.25/33.66 | 1,654.6/27,118.9 | 12/30.48 | 113.1/729.70 | 100 |
| 14/35.56 | 13/33.02 | 13.25/33.66 | 1,729.5/29,379.1 | 12/30.48 | 113.1/729.70 | 90 |
| 14/35.56 | 13/33.02 | 13.25/33.66 | 1,729.5/29,379.1 | 12/30.48 | 113.1/729.70 | 100 |
| 13/33.02 | 9/22.86 | 12.25/31.12 | 1,060.7/17,384.9 | 11/27.94 | 95.0/613.120 | 100 |
| 13/33.02 | 11/27.94 | 12.25/31.12 | 1,296.4/21,248.0 | 11/27.94 | 95.0/613.120 | 100 |
| 13/33.02 | 12/30.48 | 12.25/31.12 | 1,414.3/23,180.4 | 11/27.94 | 95.0/613.120 | 100 |
| 12/30.48 | 8/20.32 | 11.25/28.58 | 795.2/13,033.3 | 10/25.40 | 78.54/506.710 | 110 |
| 12/30.48 | 10/25.40 | 11.25/28.58 | 994.0/16,291.8 | 10/25.40 | 78.54/506.710 | 110 |
| 12/30.48 | 11/27.94 | 11.25/28.58 | 1,093.4/17,920.8 | 10/25.40 | 78.54/506.710 | 110 |
| 12/30.48 | 12/30.48 | 11.25/28.58 | 1,192.8/19,550.0 | 10/25.40 | 78.54/506.710 | 110 |
| 10/25.40 | 6.5/16.51 | 9.25/23.50 | 436.8/7,159.2 | 8/20.32 | 50.27/324.30 | 120 |
| 10/25.40 | 8/20.32 | 9.25/23.50 | 537.6/8,811.3 | 8/20.32 | 50.27/324.30 | 120 |
| 10/25.40 | 9/22.86 | 9.25/23.50 | 604.8/9,912.7 | 8/20.32 | 50.27/324.30 | 120 |
| 10/25.40 | 10/25.40 | 9.25/23.50 | 672.0/11,014.1 | 8/20.32 | 50.27/324.30 | 120 |
| 8/20.32 | 5.5/13.97 | 7.25/18.42 | 227.1/3,722.2 | 6/15.24 | 28.27/182.40 | 130 |
| 8/20.32 | 6.5/16.51 | 7.25/18.42 | 268.3/4,397.4 | 6/15.24 | 28.27/182.40 | 130 |
| 8/20.32 | 8/20.32 | 7.25/18.42 | 330.3/5,413.6 | 6/15.24 | 28.27/182.40 | 130 |
| 6/15.24 | 5.5/13.97 | 5.25/13.34 | 119.1/1952.0 | 4/10.16 | 12.57/81.10 | 140 |
| 6/15.24 | 8/20.32 | 5.25/13.34 | 173.2/2838.7 | 4/10.16 | 12.57/81.10 | 140 |

FIGURE 12-1

TUNED PASSIVE-RADIATOR PISTON
DESIGN PARAMETERS
(IN INCH/OUNCE/SECOND UNITS & CENTIMETER/GRAM/SECOND UNITS)

| BASS DRUM DIAMETER IN/CM | TUNED PASSIVE-RADIATOR PISTON MASS OZ/GM | SUSPENSION MECHANICAL COMPLIANCE IN/OZ CM/DYNE | SUSPENSION ACOUSTIC COMPLIANCE IN^5/OZ CM^5/DYNE | DRUM AIR-VOLUME ACOUSTIC COMPLIANCE IN^5/OZ CM^5/DYNE | TOTAL ACOUSTIC COMPLIANCE IN^5/OZ CM^5/DYNE | TUNED PASSIVE-RADIATOR PISTON FREQUENCY HZ |
|---|---|---|---|---|---|---|
| 44/111.8 | 28.75/815 | 1.672E-03/1.527E-07 | 2,643.968/10.037 | 100.214/.380422 | 96.554/.366529 | 10 |
| 42/106.7 | 26.63/755 | 2.084E-04/1.904E-08 | 268.521/1.0193 | 82.895/.314678 | 63.341/.240449 | 30 |
| 40/101.6 | 24.52/695 | 2.116E-03/1.934E-07 | 2,197.069/8.3403 | 70.522/.267709 | 68.329/.259383 | 10 |
| 38/96.52 | 22.40/636 | 6.011E-04/5.492E-08 | 496.390/1.8843 | 63.539/.241200 | 56.329/.213829 | 20 |
| 36/91.44 | 20.28/575 | 1.721E-04/1.572E-08 | 111.488/.42322 | 48.475/.184015 | 33.785/.128252 | 40 |
| 34/86.36 | 18.16/515 | 3.184E-03/2.909E-07 | 1,593.698/6.0498 | 43.148/.163793 | 42.011/.159476 | 10 |
| 32/81.28 | 15.34/435 | 4.253E-04/3.886E-08 | 161.552/.61327 | 29.246/.111020 | 24.763/.094003 | 30 |
| 30/76.20 | 12.52/355 | 1.890E-04/1.727E-08 | 53.378/.20262 | 29.246/.111020 | 18.894/.071723 | 50 |
| 28/71.12 | 9.700/275 | 1.516E-03/1.385E-07 | 313.794/1.1798 | 28.839/.109473 | 43.866/.166519 | 20 |
| 26/66.04 | 8.288/235 | 2.262E-04/2.067E-08 | 22.369/.08491 | 21.406/.081260 | 10.919/.041523 | 60 |
| 26/66.04 | 8.640/245 | 2.098E-04/1.917E-08 | 25.216/.09572 | 24.464/.092869 | 12.417/.047137 | 60 |
| 26/66.04 | 8.992/255 | 2.805E-04/2.563E-08 | 40.608/.15415 | 27.523/.104478 | 16.404/.062272 | 50 |
| 26/66.04 | 9.344/265 | 2.607E-04/2.382E-08 | 45.085/.17115 | 30.581/.116087 | 18.221/.069169 | 50 |
| 26/66.04 | 9.696/275 | 3.790E-04/3.463E-08 | 77.710/.29499 | 33.639/.127696 | 23.476/.089118 | 40 |
| 26/66.04 | 8.288/235 | 5.090E-04/4.650E-08 | 50.321/.19102 | 21.406/.081261 | 15.018/.057009 | 40 |
| 26/66.04 | 8.640/245 | 8.394E-04/7.670E-08 | 100.890/.38299 | 24.464/.092869 | 19.690/.074744 | 30 |
| 26/66.04 | 8.992/255 | 1.753E-03/1.602E-07 | 253.823/.96354 | 27.523/.104478 | 24.830/.094257 | 20 |
| 26/66.04 | 9.344/265 | 2.897E-03/2.647E-07 | 501.006/1.9019 | 30.581/.116087 | 28.821/.109408 | 15 |
| 26/66.04 | 9.696/275 | 6.064E-03/5.542E-07 | 1,243.623/4.7209 | 33.639/.127696 | 32.753/.124332 | 10 |
| 24/60.96 | 7.936/225 | 3.356E-04/3.066E-08 | 33.179/.12595 | 18.134/.068838 | 11.725/.044511 | 50 |
| 24/60.96 | 8.288/235 | 4.853E-04/4.434E-08 | 58.324/.22141 | 20.724/.078672 | 15.291/.058046 | 40 |
| 24/60.96 | 8.640/245 | 7.994E-04/7.304E-08 | 115.725/.43930 | 23.315/.088506 | 19.405/.073664 | 30 |
| 22/55.88 | 7.232/205 | 2.733E-04/2.496E-08 | 17.722/.06727 | 15.313/.058128 | 8.215/.031184 | 60 |
| 22/55.88 | 7.584/215 | 3.631E-04/3.318E-08 | 29.246/.11102 | 17.500/.066432 | 10.949/.041562 | 50 |
| 22/55.88 | 7.936/225 | 5.244E-04/4.791E-08 | 51.847/.19682 | 19.688/.074736 | 14.269/.054167 | 40 |
| 20/50.80 | 6.528/185 | 3.223E-04/2.944E-08 | 13.050/.04954 | 12.566/.047700 | 6.402/.024301 | 60 |
| 20/50.80 | 7.232/205 | 3.934E-04/3.595E-08 | 25.525/.09690 | 14.361/.054516 | 9.190/.034887 | 50 |
| 18/45.72 | 6.528/165 | 2.368E-04/2.163E-08 | 9.588/.03640 | 11.365/.043144 | 5.200/.019742 | 70 |
| FLOOR TOM DIAMETER IN/CM | | | | | | |
| 20/50.80 | 7.232/205 | 2.733E-04/2.496E-08 | 17.722/.06727 | 16.156/.061330 | 8.451/.032082 | 60 |
| 18/45.72 | 6.528/185 | 2.368E-04/2.163E-08 | 9.588/.03640 | 11.365/.043144 | 5.200/.019742 | 70 |
| 18/45.72 | 6.528/185 | 3.223E-04/2.944E-08 | 13.050/.04954 | 13.496/.051234 | 6.635/.025186 | 60 |
| 18/45.72 | 6.528/185 | 2.368E-04/2.163E-08 | 9.588/.03640 | 13.496/.051234 | 5.606/.021279 | 70 |
| 16/40.64 | 5.824/165 | 2.154E-04/1.967E-08 | 5.111/.01940 | 8.939/.033934 | 3.252/.012344 | 80 |
| 16/40.64 | 5.824/165 | 2.813E-04/2.570E-08 | 6.678/.02535 | 10.057/.038176 | 4.013/.015234 | 70 |
| 16/40.64 | 5.824/165 | 2.154E-04/1.967E-08 | 5.111/.01940 | 10.057/.038176 | 3.389/.012863 | 80 |
| 14/35.56 | 5.120/145 | 2.040E-04/1.864E-08 | 2.614/.00993 | 5.953/.022600 | 1.817/.006896 | 90 |
| 14/35.56 | 5.120/145 | 1.653E-04/1.510E-08 | 2.118/.00804 | 5.953/.022600 | 1.562/.005930 | 100 |
| MOUNTED TOM DIAMETER IN/CM | | | | | | |
| 16/40.64 | 5.824/165 | 2.154E-04/1.967E-08 | 5.111/.01940 | 7.822/.029691 | 3.091/.011734 | 80 |
| 16/40.64 | 5.824/165 | 2.154E-04/1.967E-08 | 5.111/.01940 | 8.939/.033934 | 3.252/.012344 | 80 |
| 15/38.10 | 5.472/155 | 2.355E-04/2.152E-08 | 4.157/.01578 | 5.851/.022210 | 2.430/.009226 | 80 |
| 15/38.10 | 5.472/155 | 1.861E-04/1.700E-08 | 3.284/.01247 | 5.851/.022210 | 2.103/.007985 | 90 |
| 15/38.10 | 5.472/155 | 2.355E-04/2.152E-08 | 4.157/.01578 | 6.825/.025910 | 2.584/.009808 | 80 |
| 15/38.10 | 5.472/155 | 1.861E-04/1.700E-08 | 3.284/.01247 | 6.825/.025910 | 2.217/.008417 | 90 |
| 15/38.10 | 5.472/155 | 2.355E-04/2.152E-08 | 4.157/.01578 | 7.313/.027761 | 2.650/.010061 | 80 |
| 15/38.10 | 5.472/155 | 1.861E-04/1.700E-08 | 3.284/.01247 | 7.313/.027761 | 2.266/.008603 | 90 |
| 15/38.10 | 5.472/155 | 2.355E-04/2.152E-08 | 4.157/.01578 | 8.288/.031463 | 2.769/.010510 | 80 |
| 15/38.10 | 5.472/155 | 1.861E-04/1.700E-08 | 3.601/.01367 | 8.288/.031463 | 2.510/.009529 | 90 |
| 14/35.56 | 5.120/145 | 2.040E-04/1.864E-08 | 2.118/.00804 | 4.253/.016143 | 1.414/.005367 | 90 |
| 14/35.56 | 5.120/145 | 1.653E-04/1.510E-08 | 2.615/.00993 | 4.253/.016143 | 1.619/.006146 | 100 |
| 14/35.56 | 5.120/145 | 2.040E-04/1.864E-08 | 2.118/.00804 | 5.103/.019371 | 1.497/.005682 | 90 |
| 14/35.56 | 5.120/145 | 1.653E-04/1.510E-08 | 2.614/.00993 | 5.103/.019371 | 1.729/.006563 | 100 |
| 14/35.56 | 5.120/145 | 2.040E-04/1.864E-08 | 2.118/.00804 | 5.528/.020985 | 1.531/.005813 | 90 |
| 14/35.56 | 5.120/145 | 1.653E-04/1.510E-08 | 2.330/.00884 | 5.528/.020985 | 1.639/.006222 | 100 |
| 13/33.02 | 4.768/135 | 1.818E-04/1.661E-08 | 1.645/.00624 | 3.271/.012417 | 1.094/.004155 | 100 |
| 13/33.02 | 4.768/135 | 1.818E-04/1.661E-08 | 1.645/.00624 | 3.998/.015177 | 1.165/.004424 | 100 |
| 13/33.02 | 4.768/135 | 1.818E-04/1.661E-08 | 1.645/.00624 | 4.362/.016557 | 1.194/.004534 | 100 |
| 12/30.48 | 4.416/125 | 1.658E-04/1.515E-08 | 1.025/.00389 | 2.452/.009310 | .7227/.002744 | 110 |
| 12/30.48 | 4.416/125 | 1.658E-04/1.515E-08 | 1.025/.00389 | 3.066/.011637 | .7679/.002915 | 110 |
| 12/30.48 | 4.416/125 | 1.658E-04/1.515E-08 | 1.025/.00389 | 3.372/.012801 | .7859/.002983 | 110 |
| 12/30.48 | 4.416/125 | 1.658E-04/1.515E-08 | 1.025/.00389 | 3.679/.013964 | .8014/.003042 | 110 |
| 10/25.40 | 3.696/105 | 1.723E-04/1.574E-08 | .4361/.00166 | 1.347/.005114 | .3294/.001251 | 120 |
| 10/25.40 | 3.696/105 | 1.723E-04/1.574E-08 | .4361/.00166 | 1.658/.006294 | .3453/.001311 | 120 |
| 10/25.40 | 3.696/105 | 1.723E-04/1.574E-08 | .4361/.00166 | 1.865/.007081 | .3534/.001342 | 120 |
| 10/25.40 | 3.696/105 | 1.723E-04/1.574E-08 | .4361/.00166 | 2.072/.007867 | .3603/.001368 | 120 |
| 8/20.32 | 2.992/85 | 1.875E-04/1.714E-08 | .1502/.00057 | .7004/.002659 | .1237/.000695 | 130 |
| 8/20.32 | 2.992/85 | 1.875E-04/1.714E-08 | .1502/.00057 | .8274/.003141 | .1271/.000483 | 130 |
| 8/20.32 | 2.992/85 | 1.875E-04/1.714E-08 | .1502/.00057 | 1.019/.003867 | .1309/.000497 | 130 |
| 6/15.24 | 2.288/65 | 2.148E-04/1.963E-08 | .0340/.00013 | .3673/.001394 | .0311/.000118 | 140 |
| 6/15.24 | 2.288/65 | 2.148E-04/1.963E-08 | .0340/.00013 | .5341/.002028 | .0320/.000121 | 140 |

FIGURE 12-2

PASSIVE RADIATOR BAFFLE PANEL FOR DRUM TYPE-PERCUSSION INSTRUMENTS

This is a continuation-in-part of copending application Ser. No. 07/525,200, filed on May 18, 1990, now U.S. Pat. No. 5,095,796.

FIELD OF THE INVENTION

The present invention relates to musical instruments, particularly percussion instruments such as drums.

BACKGROUND OF THE INVENTION

In conventional drums such as a bass drum, the drum comprises a beater drumhead membrane mounted to the drum shell. The side of the drum opposite the beater drumhead may be open, or it may have another drumhead membrane, known as the carry, or resonating, head.

BRIEF SUMMARY OF THE INVENTION

The invention is a passive radiator baffle panel which mounts to the drum shell on the side opposite the beater drumhead membrane. The invention enhances the live acoustic sound of drum type percussion instruments by giving the low-frequency response an improved "punch". This enhanced low-frequency response is achieved by replacing the resonating head with a rigid passive radiator piston having a mass and area selected to tune the drum baffle to the appropriate percentage of the free-air resonant frequency of the beater drumhead membrane in order to control the peak amplitude of the beater drumhead membrane and extend the low-frequency response of the acoustic drum.

The passive radiator baffle panel has the piston resiliently fastened to the side of the drum opposite the beater drumhead membrane. This resilient mounting may be achieved by a rim fastened to the drum which has an acoustically compliant rubber suspension to resiliently hold the piston in place. Alternatively, a rigid piston may be affixed to a standard drum membrane. The piston is preferably flat or curved, and most preferably concave. A microphone may be affixed to the baffle panel or the drum instrument.

Musical drum type percussion instruments require the use of the hands, drum sticks, or in the case of a bass drum, a foot pedal and beater to transfer the percussive force to the drum. This striking force is transferred to the beater membrane and then to the air inside the drum. The passive radiator baffle panel of the present invention acts as a sound control and tuning element which selectively controls the amount of sound being emitted from the drum due to the striking of the beater membrane.

The piston in the rigid baffle panel allows frequencies to be emitted from the drum shell in phase with the frequencies emitted from the front of the beater membrane. The piston controls the speed and radiation of the rear sound wave created by the beater drumhead membrane and which traverses the depth of the drum shell. The piston delays the rear sound wave slightly so that the rear sound wave is radiated in phase with the sound wave radiated from the front side of the beater drumhead membrane.

A passive radiator baffle panel of the invention mounted in a drum improves over an open-ended or double-headed drum because the peak amplitude at the resonant frequency of the beater drumhead membrane is reduced. The passive radiator baffle panel resists excessive vibration at resonance and properly loads the beater drumhead membrane with the pressurized internal volume of air. This insures that the drum will be tuned to the frequency for which the radiator is selected. This extends the bass response and reduces boominess associated with uncontrolled resonance, giving a smoother and more controlled acoustic drum sound.

If desired, a tuned port may also be provided in the piston or elsewhere in the baffle. A microphone is also preferably imbedded in the piston.

FIG. **11*a*** is a schematic circuit diagram for a microphone amplifier circuit for a baffle panel when phantom power is available to operate the microphone.

FIG. **11*b*** is a schematic circuit diagram for a double microphone amplifier circuit for a baffle panel when phantom power is available to operate the microphone.

FIG. **11*c*** is a schematic circuit diagram for a microphone amplifier circuit operating on battery power.

Figure 1:
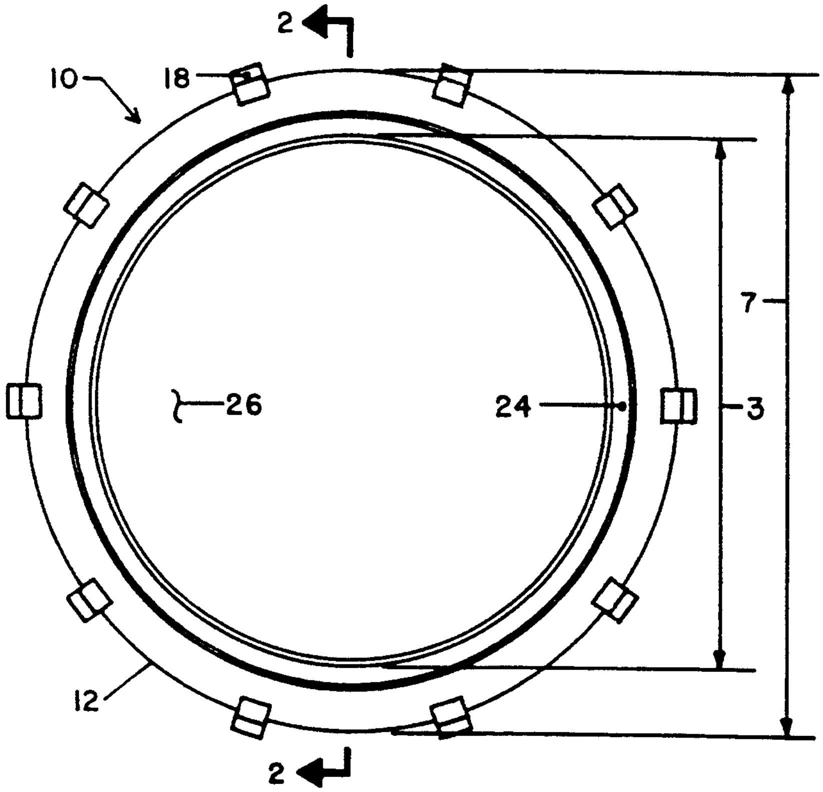
FIG. 1 is a front elevation view of an embodiment of a passive radiator baffle panel.
Figure 2:
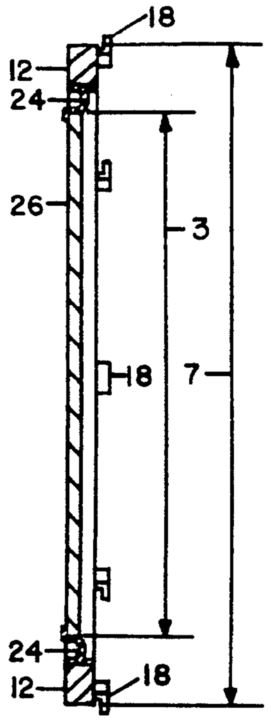
FIG. 2 is a cross-section along the line "2—2" of the baffle panel of FIG. 1.
Figure 3:
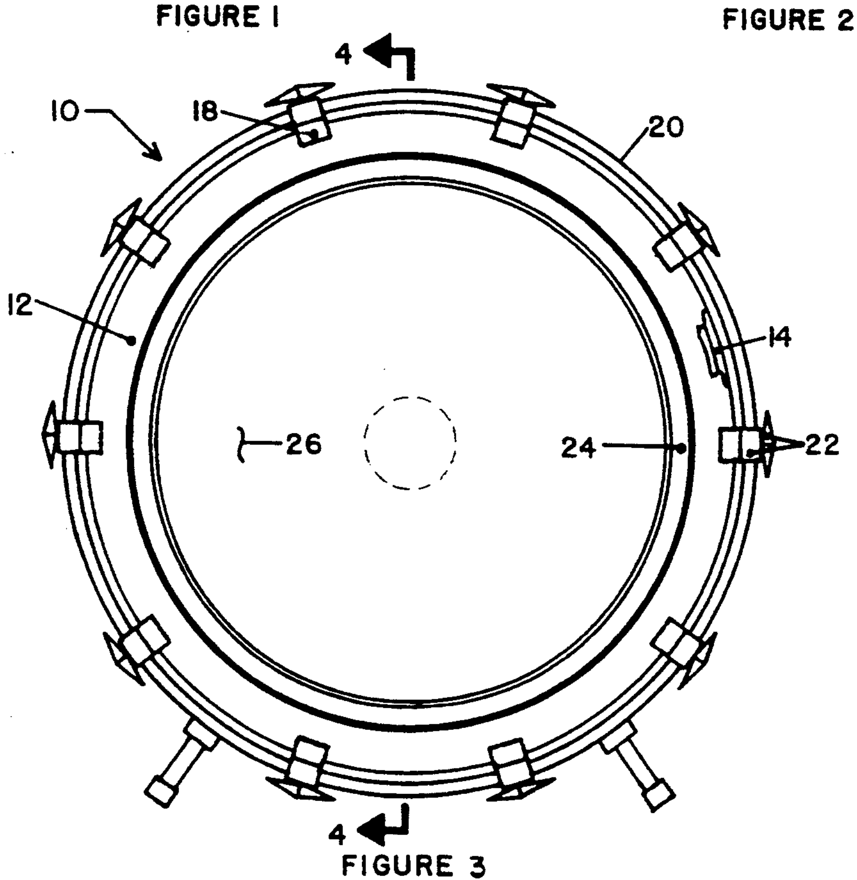
FIG. 3 is a front elevation view of the baffle panel of FIG. 1 mounted to the front of a bass drum.
Figure 4:
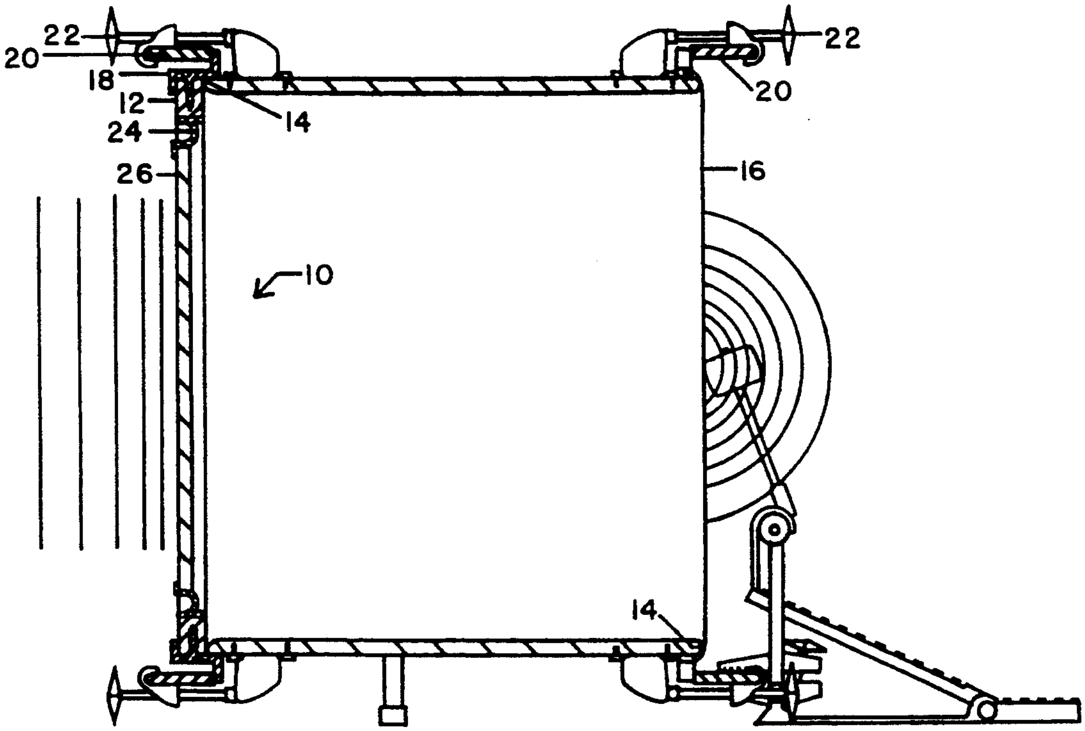
FIG. 4 is a cross sectional view along the line "4—4" of FIG. 3, and shows the baffle panel mounted to the bass drum with the drum pedal and beater drumhead membrane in place.
Figure 5:
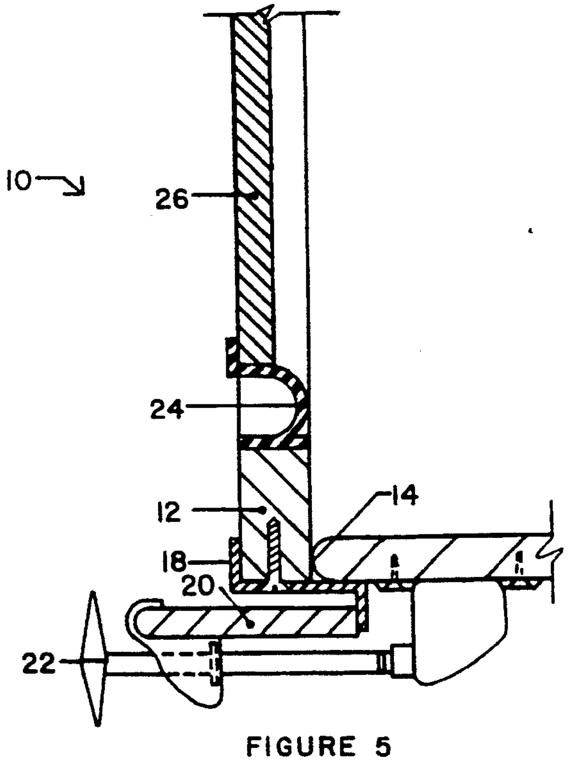
FIG. 5 is a detail section of FIG. 4, and shows the mounting of the baffle panel to the drum shell.

FIGS. 12-1 and 12-2 are a table of design parameters for passive radiator baffle panels for drum type percussion instruments in accordance with the invention.

DETAILED DESCRIPTION OF THE INVENTION

Referring to FIGS. 1–12, a passive radiator baffle panel 10 in accordance with one embodiment of the invention is shown.

Baffle panel 10 is adapted to mount in a drum instrument having a drum shell and a beater membrane. Baffle panel 10 has a rigid circular outer rim 12 which is sufficiently thick, and made of sufficiently stiff materials so as to resist flexural movement. This rigidity minimizes undesirable resonances.

Rim 12 is mounted to a drum shell edge 14 of a drum instrument opposite the beater membrane 16 of the drum instrument using baffle panel clips 18 which are secured to the drum by a drumhead rim 20 and tension rod brackets 22.

Rim 12 has in its inner circumference a resilient rubber acoustic suspension ring 24. Suspension ring 24 retains piston 26 to rim 12, yet is sufficiently resilient to permit the necessary degree and speed of travel to permit piston 26 to generate sound waves upon energy input to the drum from the beater membrane 16. Suspension ring may be affixed to the rim 12 and piston 26 by gluing and/or by mechanical fasteners.

Piston 26 is a rigid panel and is sufficiently thick and stiff to resist flexural movement. Piston 26 has a mass selected to provide a tuned sound output from the drum instrument wherein sound waves created by an impact against the beater membrane are radiated by piston 26 in phase with and additively with sound waves radiated from the beater membrane 16, so that the peak amplitude of the resonant frequency of the beater membrane 16 is reduced. The drum instrument is thereby provided with an extended low frequency response. Piston 26 may have a mass selected to give a tuned sound output from the drum at the resonant frequency of the beater membrane 16 or it may have an area selected to give a tuned sound output from the drum at a frequency other than the resonant frequency of the beater membrane 16.

In the preferred embodiment, piston 26 is generally circular, however if desired, the piston 26 may be non-circular, so long as piston 26 is of the selected mass.

Typically, the baffle panel 10 will be sized and will have a circular perimeter to match the drum to which it is mounted. However, other shapes can be adopted as necessary to match a drum shape. For example, triangular, hexagonal, rectangular or other shapes might be used. Where the baffle panel 10 is circular, it will have an outer circular edge and the piston 26 will be contained, preferably concentrically, within the outer circular edge.

The mass of piston 26 is preferably selected using the design parameters set out in the Table of FIG. 12. FIG. 12 shows the necessary mass and area for a piston 26 to tune drums of a variety of sizes to a variety of selected frequencies. For example, FIG. 12 shows various bass drum, floor tom, and mounted tom drum sizes and corresponding piston masses needed to tune the drums to selected frequencies ranging from about 50 hertz (bass drum) up to about 140 hertz (tom drum). The selected frequencies of about 50, 60, 70, 80, 90, 100, 110, 120, 130 or 140 hertz shown in FIG. 12 reflect typical desirable frequencies for a drum.

If desired, a tuned port may also be provided in the piston as set forth in my application Ser. No. 07/525,200.

Figure 6:
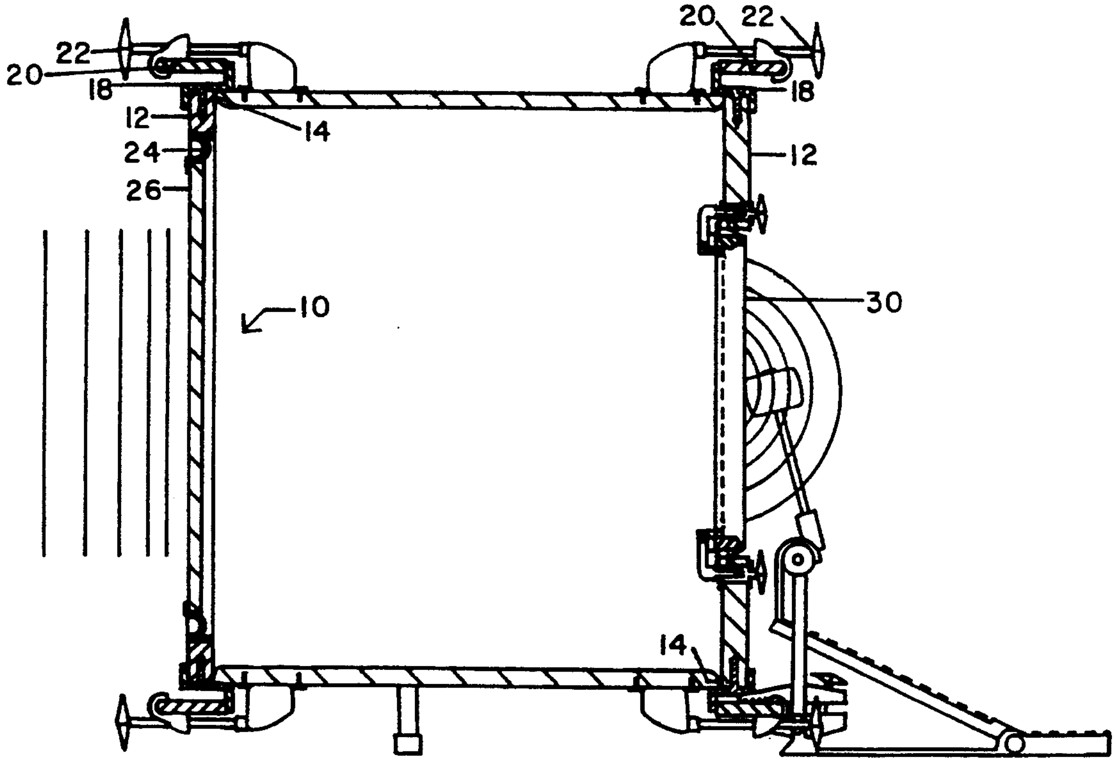
FIG. 6 is an alternative embodiment of the invention showing a sized beater drumhead.
Figure 7:
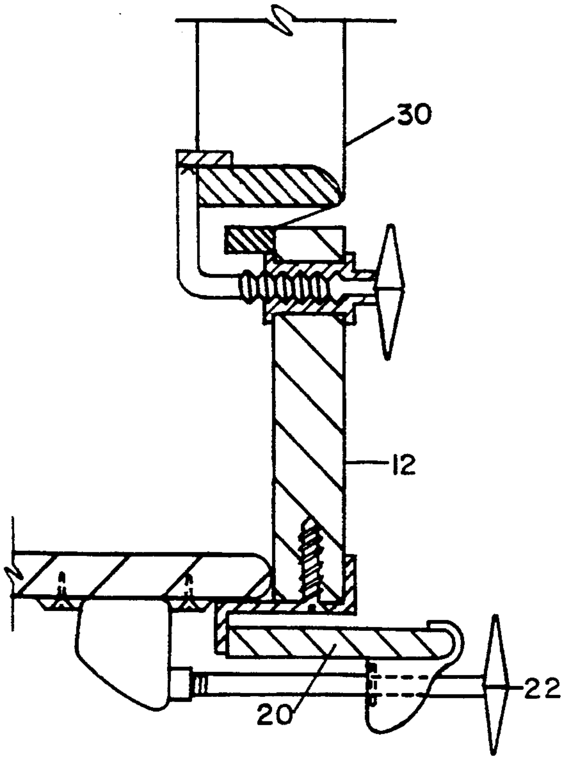
FIG. 7 is a detail view of a section of FIG. 6 showing the mounting of the beater membrane to the drum shell.

In one preferred embodiment, acoustic compliance is improved where the piston has a larger surface area than the beater membrane. Referring now to FIGS. 6 and 7, a reduced diameter beater membrane 30 is shown. Reduced membrane 30 is adapted to fit in a standard bass drum and permits use of a piston with an area nearly equal to the maximum area of a face of the drum shell. Preferably the surface area of piston 26 is about twice the surface area of reduced diameter beater membrane 30.

In an alternative embodiment, the piston 26 is mounted directly by adhesives or by mechanical fasteners to a conventional resonating head. In this case, the piston 26 could be a rigid plastic panel. The piston 26 may be a laminate, and might have two mating pieces with the membrane sandwiched between them. In this case the membrane and piston will be mounted on the drum in a conventional manner. A tuned port may also be provided.

Figure 8:
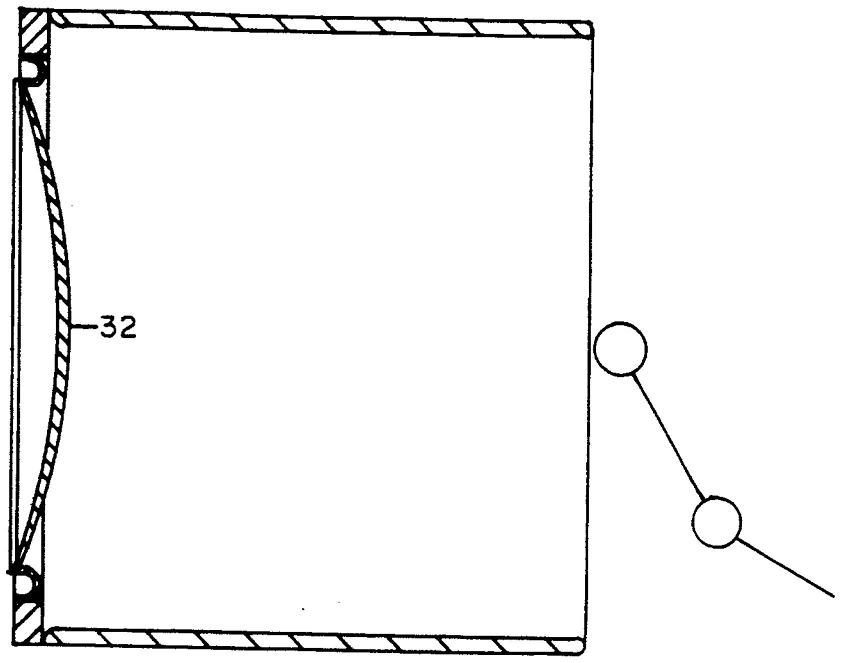
FIGS. 8 and 9 are alternative embodiments of the passive radiator baffle panel showing pistons having curved surfaces.
Figure 9:
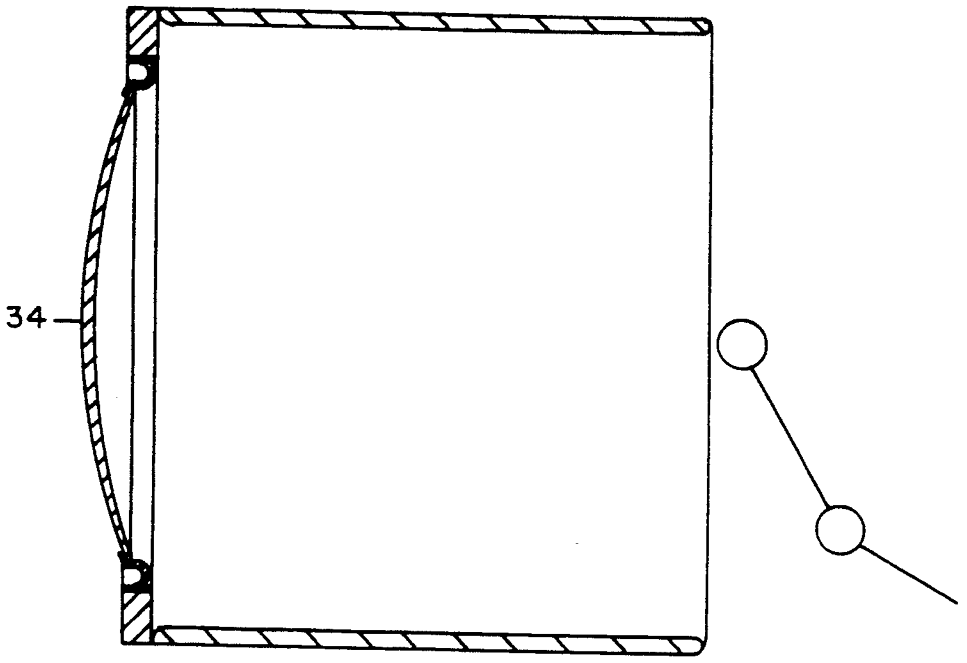

Referring now to FIGS. 8 and 9, two curved pistons are shown. In FIG. 8, piston 32 is concave. In FIG. 9, piston 34 is convex. The concave piston 32 is preferred.

Figure 10:
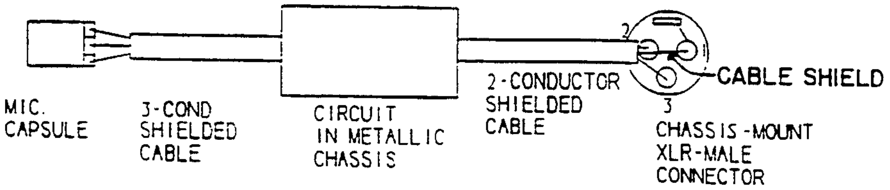
FIG. 10 is a schematic component layout for a microphone for a baffle panel.
Figure 11A:
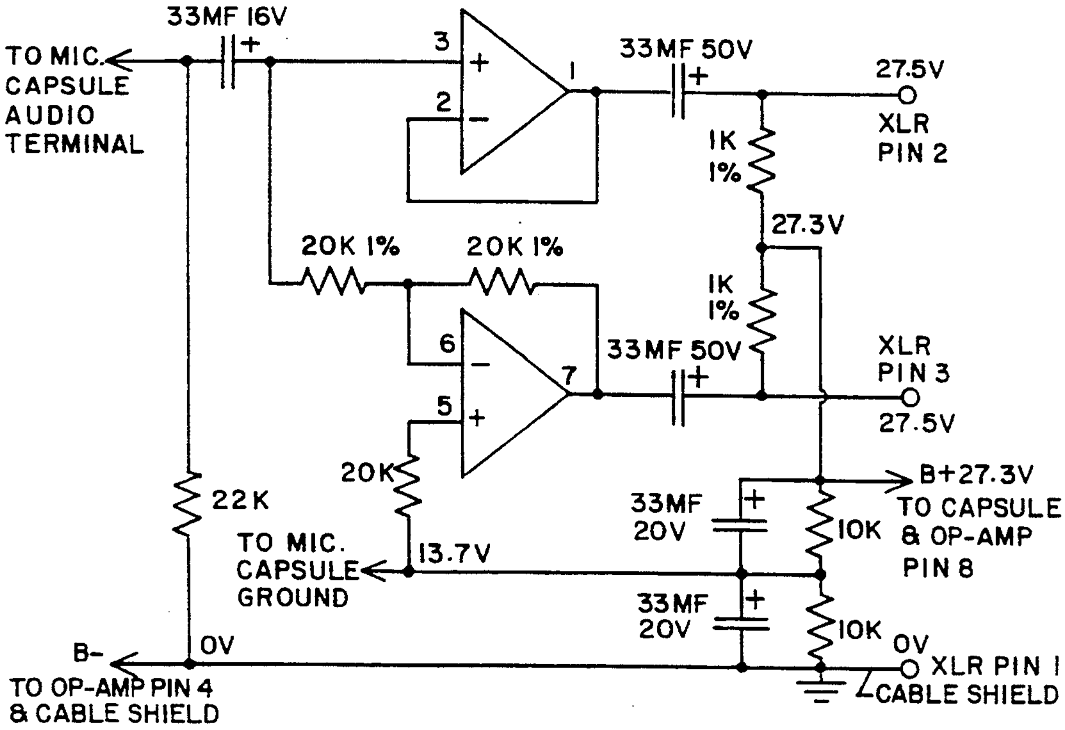
Figure 11B:
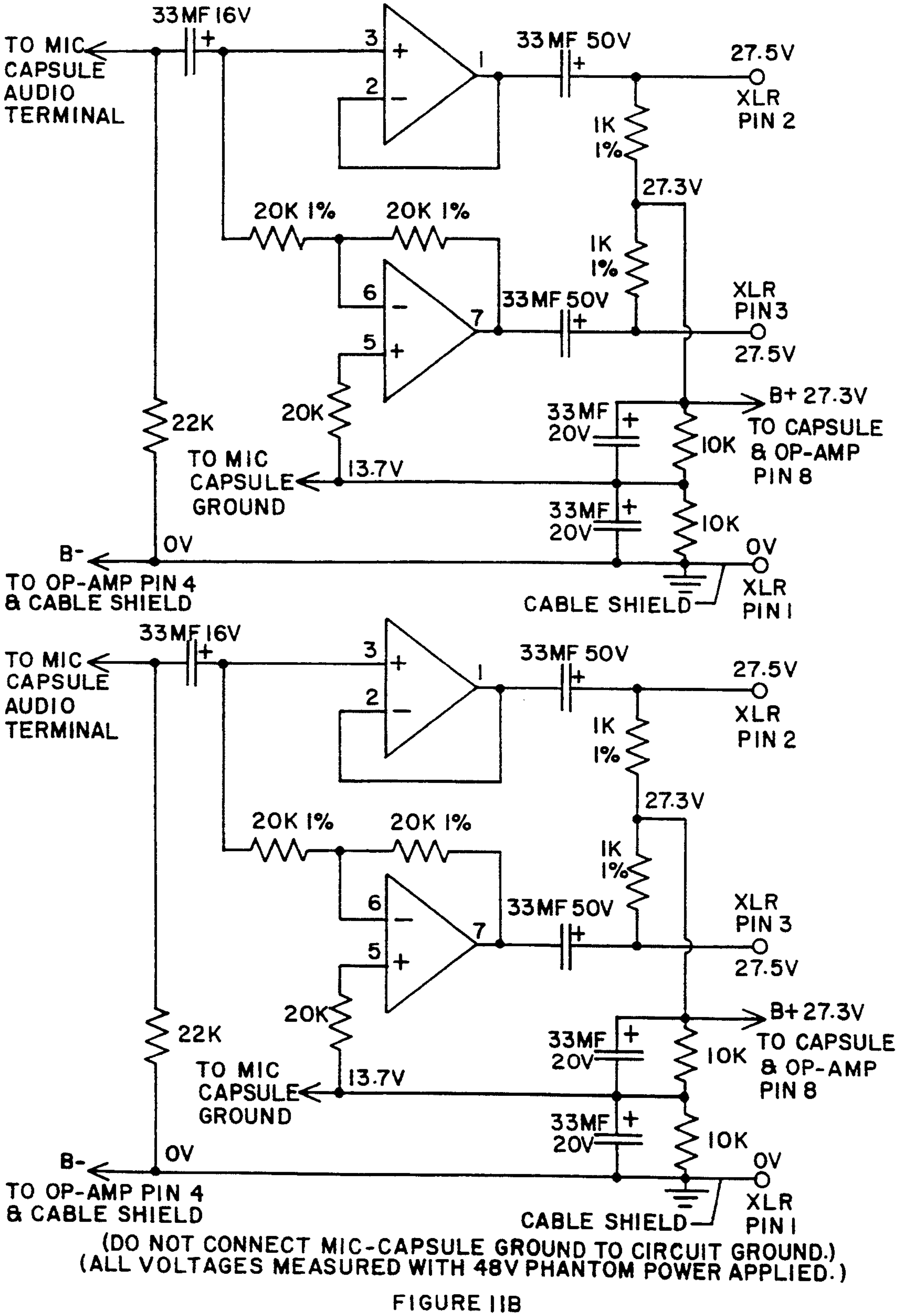
Figure 11C:
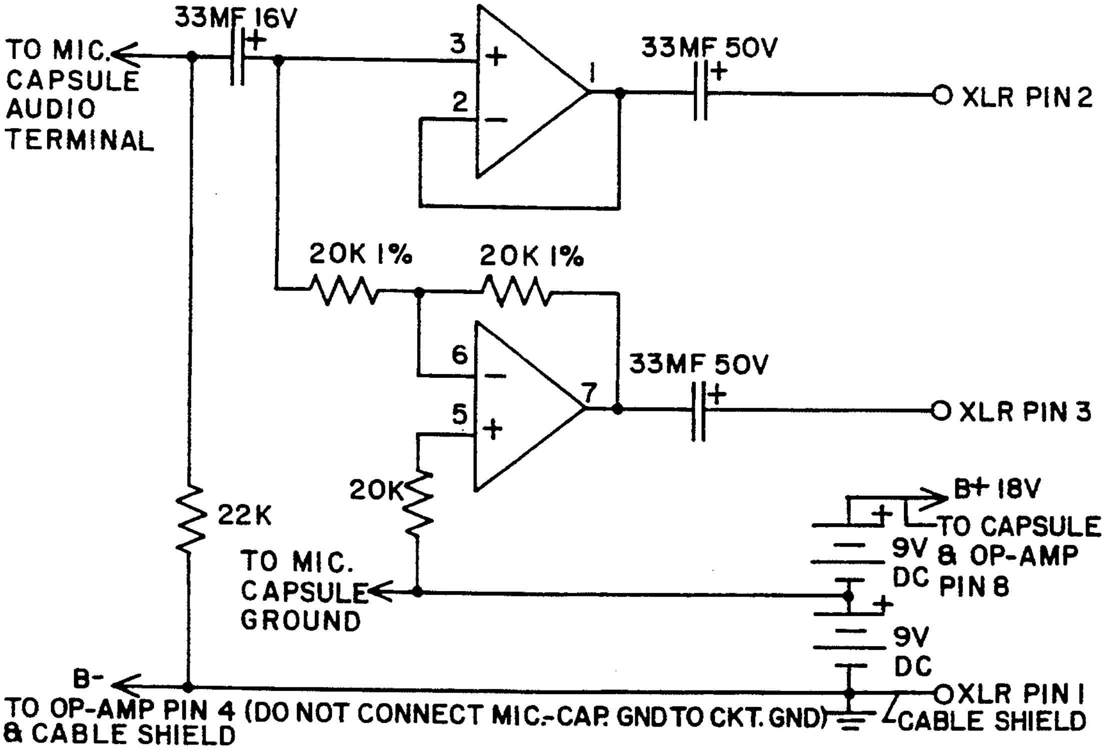

Referring now to FIGS. 10 and 11, a circuit layout for a microphone for amplification of a drum instrument incorporating a passive radiator baffle panel 10 is shown.

In FIG. 10, a microphone capsule is imbedded in the drum, preferably in piston 26. The microphone capsule is resistant to shocks and impacts. An amplifier circuit for the microphone capsule is shown in FIG. 11. This gives a microphone output suited for further amplification in a conventional concert sound system.

The present invention provides a unique percussion product with a tunable percussion output. The invention is not limited to the description above but includes such variations and equivalents known in the art.

I claim:

1. A baffle panel for a drum instrument having a drum shell and a beater membrane, said beater membrane having a resonant frequency having a peak amplitude, comprising:

a rigid passive radiator piston, said piston being sufficiently thick, and made of sufficiently stiff materials so as to resist flexural movement of said piston;

means for resiliently mounting said piston on the drum instrument opposite the beater membrane of the drum instrument; and said piston having a mass and an area, said piston mass being selected to provide a tuned sound output from the drum instrument wherein sound waves created by an impact against the beater membrane are transmitted from said beater membrane to said piston to cause said piston to oscillate to create piston sound waves which are in phase with and additive with sound waves radiated from the beater membrane externally of the drum instrument, whereby the drum instrument is provided with a tuned sound output.

2. A baffle panel in accordance with claim 1 wherein said piston has a mass selected to give a tuned sound output from said drum instrument at a resonant frequency of the beater membrane.

3. A baffle panel in accordance with claim 1 wherein said piston has a mass selected to give a tuned sound output from said drum instrument at a frequency other than a resonant frequency of the beater membrane.

4. A baffle panel in accordance with claim 1, wherein said tuned sound output has a frequency of about 50, 60, 70, 80, 90, 100, 110, 120, 130, or 140 hertz.

5. A baffle panel in accordance with claim 1, wherein said tuned sound output has a frequency selected from a range of about 50 to about 140 hertz.

6. A baffle panel in accordance with claim 5, wherein said resilient mounting means comprises a rigid circular rim for mounting to the drum instrument, a compliant rubber suspension affixed to an inner diameter of the rim, said rubber suspension being also affixed to said piston.

7. A baffle panel in accordance with claim 6, further comprising a tuned port provided in said piston, said port having an area selected to provide a tuned sound output.

8. A baffle panel in accordance with claim 6, wherein said piston in cross section is a curved panel.

9. A baffle panel in accordance with claim 8, wherein said piston is a concave panel.

10. A baffle panel in accordance with claim 6, wherein said piston is a flat panel.

11. A baffle panel in accordance with claim 5, wherein said resilient mounting means comprises a conventional drum membrane mounted to the drum instrument and wherein said piston is affixed to said drum membrane.

12. A baffle panel in accordance with claim 11, wherein said piston comprises two piston halves with said conventional drum membrane contained therebetween.

13. A baffle panel in accordance with claim 11, wherein said piston comprises a laminated material.

14. A baffle panel in accordance with claim 11, further comprising a tuned port in said piston and conventional drum membrane, said tuned port having an area selected to provide a tuned sound output.

15. A baffle panel in accordance with claim 6, further comprising a microphone affixed to said piston or drum instrument.

16. A baffle panel in accordance with claim 1, further comprising a microphone affixed to said baffle panel.

17. A baffle panel in accordance with claim 1, wherein said piston has a surface area which is larger than the surface area of said beater membrane.

18. A baffle panel in accordance with claim 17, wherein said piston has a surface area which is about twice the surface area of said beater membrane.

19. A baffle panel for a drum instrument having a drum shell and a beater membrane, said beater membrane having a resonant frequency having a peak amplitude, comprising:

a rigid rim element for mounting to said drum instrument opposite from said beater membrane;

a rigid passive radiator piston, said piston being sufficiently thick, and made of sufficiently stiff materials so as to resist flexural movement of said piston;

a resilient acoustically compliant rubber suspension gasket affixed to said rim and to said piston to resiliently retain said piston to said rim;

said piston having a mass and an area, said piston mass and piston area being selected to provide a tuned sound output from the drum instrument wherein sound waves created by an impact against the beater membrane are transmitted from said beater membrane to said piston to cause said piston to oscillate to create piston sound waves which are in phase with and additive with sound waves radiated from the beater membrane externally of the drum instrument, whereby the drum instrument is provided with a tuned sound output at a frequency selected from a range of about 50 to about 140 hertz.

20. A baffle panel for a drum instrument having a drum shell and a beater membrane, said beater membrane having a resonant frequency and a peak amplitude, comprising:

a conventional drum membrane affixed to said drum instrument opposite said beater membrane;

a rigid passive resonator piston affixed to said conventional drum membrane, said piston having a mass and area selected to provide a tuned sound output from said drum instrument wherein waves created by oscillation of said piston are additive to sound waves created by said beater membrane.

* * * * *